July 18, 1967  R. K. SHELBY  3,331,908
MOLDING MACHINES
Filed Dec. 26, 1963  5 Sheets-Sheet 5

INVENTOR.
RICHARD K. SHELBY
BY *Robert J. Schaap*
ATTORNEY

United States Patent Office 3,331,908
Patented July 18, 1967

3,331,908
MOLDING MACHINES
Richard K. Shelby, Downers Grove, Ill., assignor to Monsanto Company, St. Louis, Mo., a corporation of Delaware
Filed Dec. 26, 1963, Ser. No. 333,313
12 Claims. (Cl. 264—322)

ABSTRACT OF THE DISCLOSURE

A molding machine having a pair of cooperating die frames and each of the die frames having cooperating die elements. Heater banks mounted in spaced relation to each of the die frames and having a number of heaters which are substantially equal to the number of cooperating dies and which are located in the same pattern so that a web of thermoplastic material which passes between the heaters is next passed between the dies for engagement of the heated areas. An embodiment employs a heat reflective plate on the opposite side of the web with respect to one bank of heaters.

---

Figure 1:
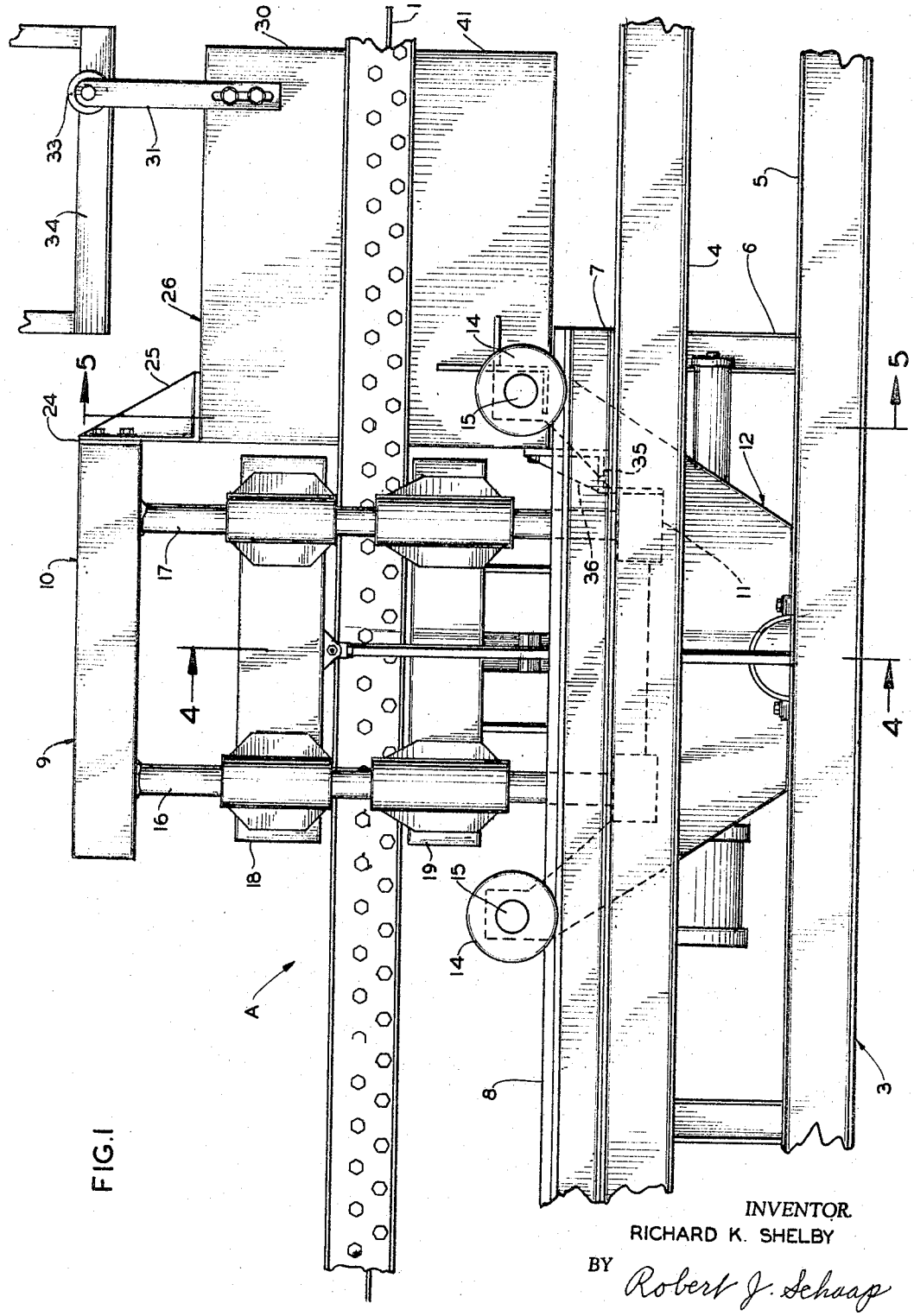

This invention relates in general to new and useful improvements in molding machines and more particularly, to an improved type of heating device employed in molding machines and similar types of apparatus.

Today it has become a common practice to employ thermoplastic material in the manufacture of thin-walled containers and similar products, since materials of this type are capable of being thermoformed. Thermoplastic materials such as polystyrene and modified polystyrene have been used in large proportions inasmuch as these materials possess the necessary properties for molding operations. Large webs of this type of thermoplastic material are normally passed through a pair of cooperating dies forming a part of the molding machine. However, prior to the passage between the dies where the web is formed into thin-walled products, the web of thermoplastic material must be preheated to a suitable temperature where it is sufficiently pliable and capable of being readily molded when it is subsequently passed between the dies. Normally, the dies are also provided with suitable heating means to bring the thermoplastic material up to the molding temperature while the material is being formed within the dies.

The molding machines presently used employ a wide variety of heating devices for accomplishing this preheating function. For the most part, these preheating devices consist of banks of heating tubes or lamps, such as the type described in United States Letters Patent 2,967,328. The lamps usually extend transversely across the molding machine and in a direction which is perpendicular to the movement of the web of thermoplastic material. However, devices of this type have been found to be unsatisfactory inasmuch as they are not capable of providing localized heating. It is well known in the art of thermoplastic forming that proper heat distribution across the area of the web which is to be formed is a critical factor. It is normally desirable to heat only that portion of the web which is ultimately formed within the dies. This portion of the web, however, must have linear heat distribution across the entire area so that the finally molded product will have a linear material distribution. Moreover, it is undesirable to heat those portions of the web which are not in contact with the dies since these portions of the web must act as a support for the finally molded articles.

The devices of the prior art did not have suitable means for providing even temperature distribution in these areas where it was desired to provide even temperature distribution and consequently, the finally molded article suffered from non-linear distribution of material. Moreover, the supporting portions of the web were heated to a point where they became fairly elastic and did not provide sufficient support for the molded articles prior to the stripping of the molded articles from the web.

It is, therefore, the primary object of the present invention to provide a molding machine which includes heating means which are capable of shifting in timed relation to a moveable carriage and, thereby, provide localized heating on a continuous moving web of thermoplastic material.

It is another object of the present invention to provide a heating device which is suitable for use with molding machines having continuously moving webs of thermoplastic material.

It is also an object of the present invention to provide heating devices of the type stated which are capable of moving in timed relation to a moveable web of thermoplastic material for providing localized heating.

It is a further object of the present invention to provide a heating means of the type stated which is relatively economical to manufacture and is economical to operate.

It is another salient object of the present invention to provide a molding machine of the type stated which is highly efficient in its operation and is capable of mass producing molded articles with a minimum amount of spoilage.

With the above and other objects in view, my invention resides in the novel features of form, construction, arrangement, and combination of parts presently described and pointed out.

Figure 2:
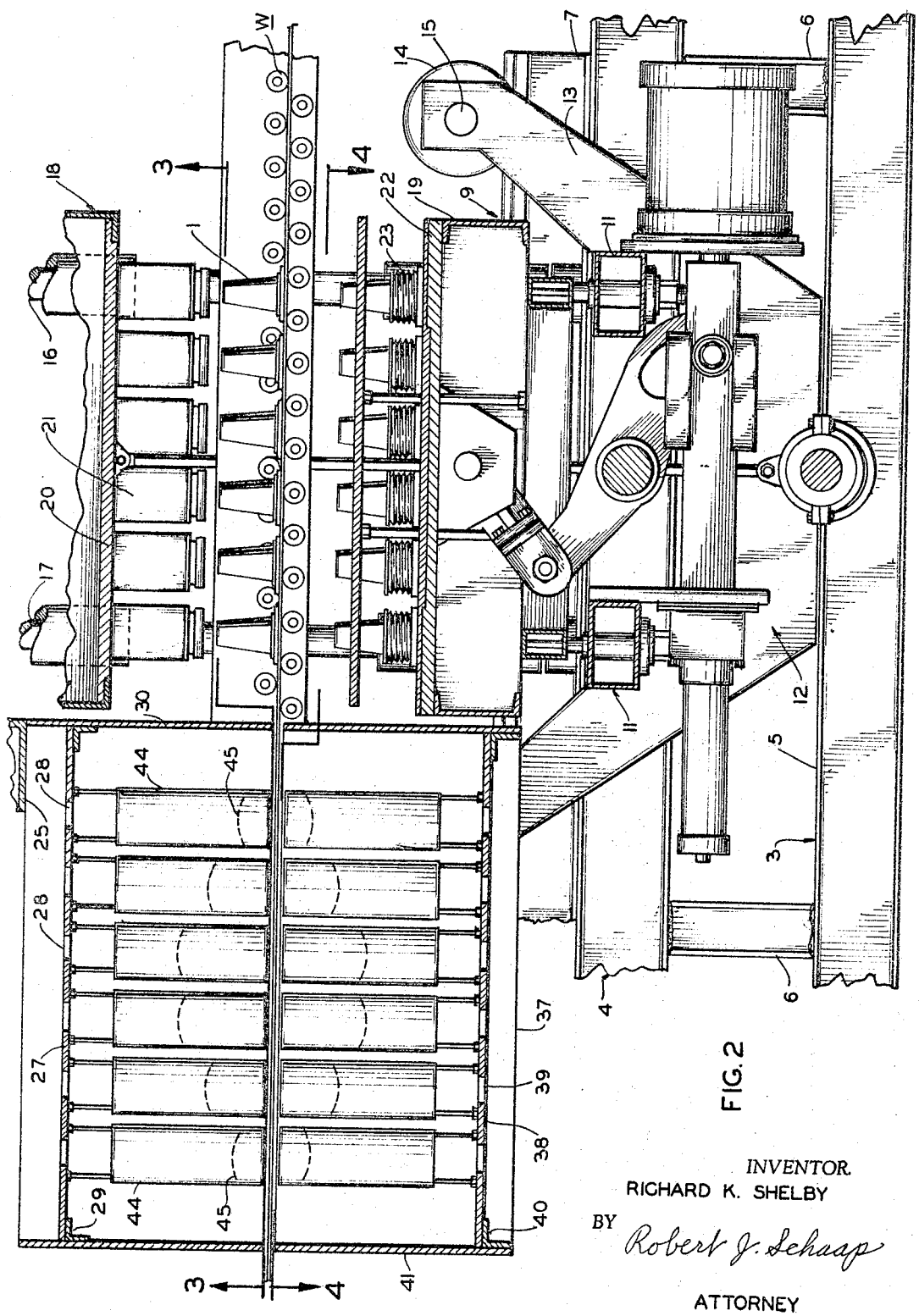
Figure 3:
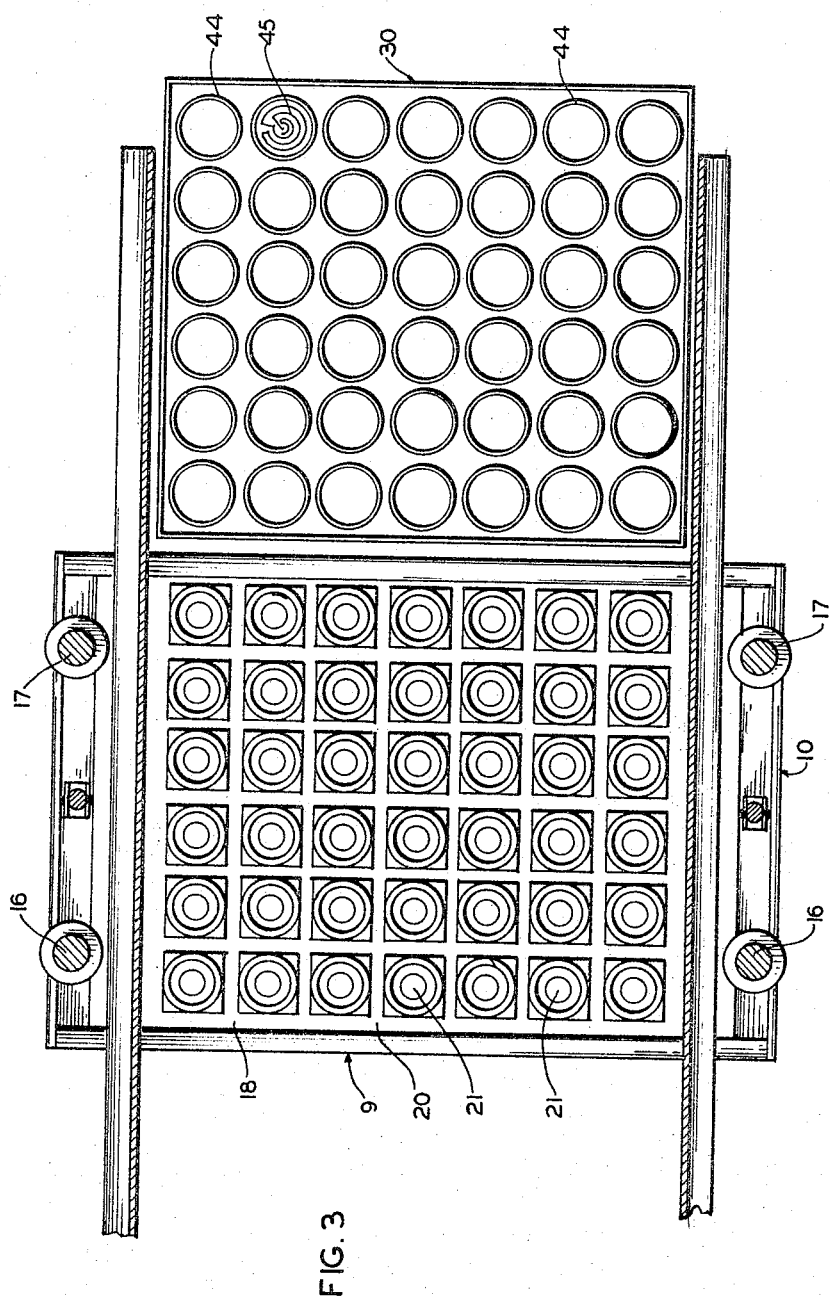
Figure 4:
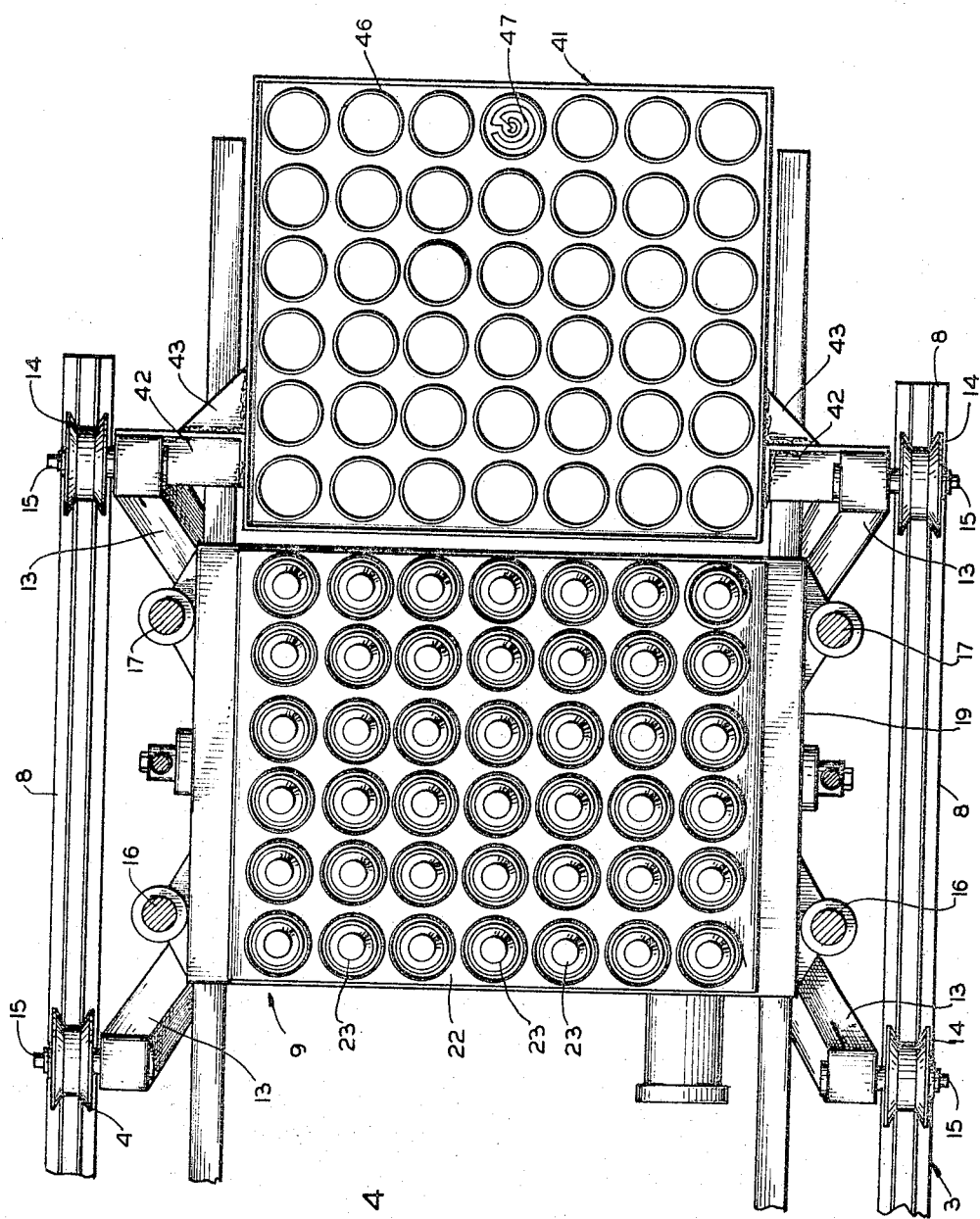
Figure 5:
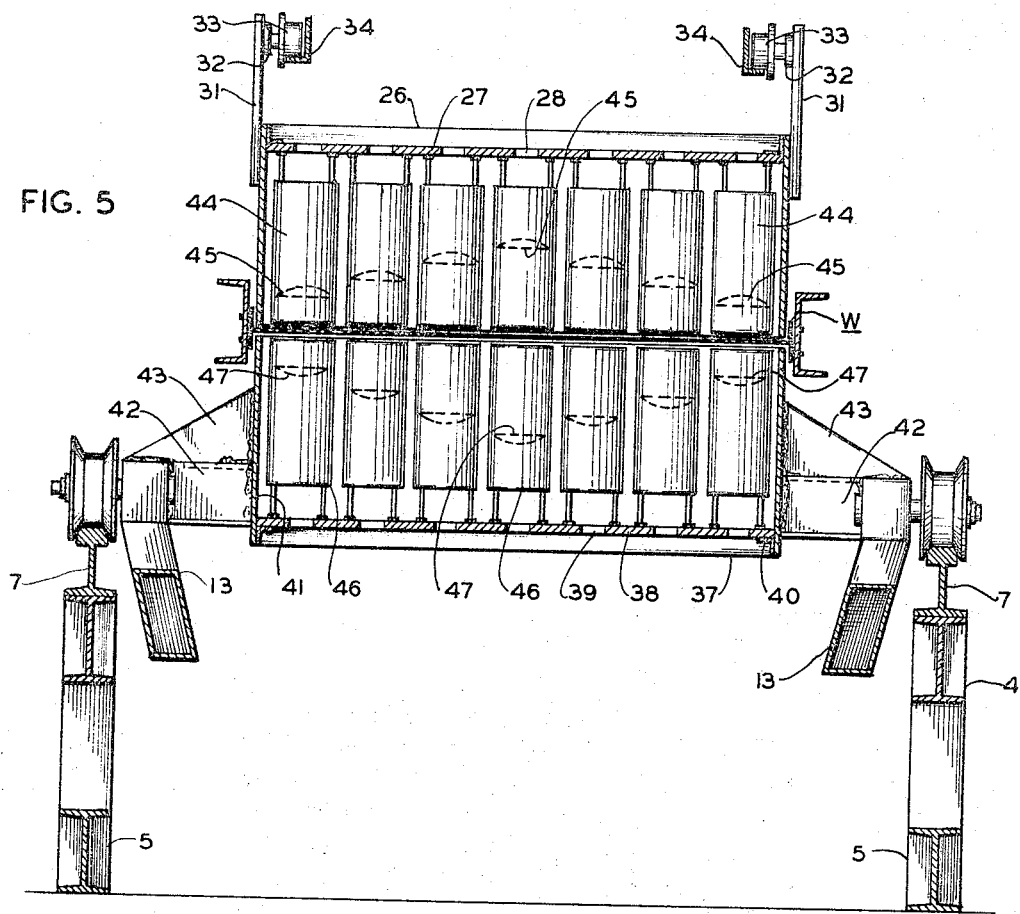
Figure 6:
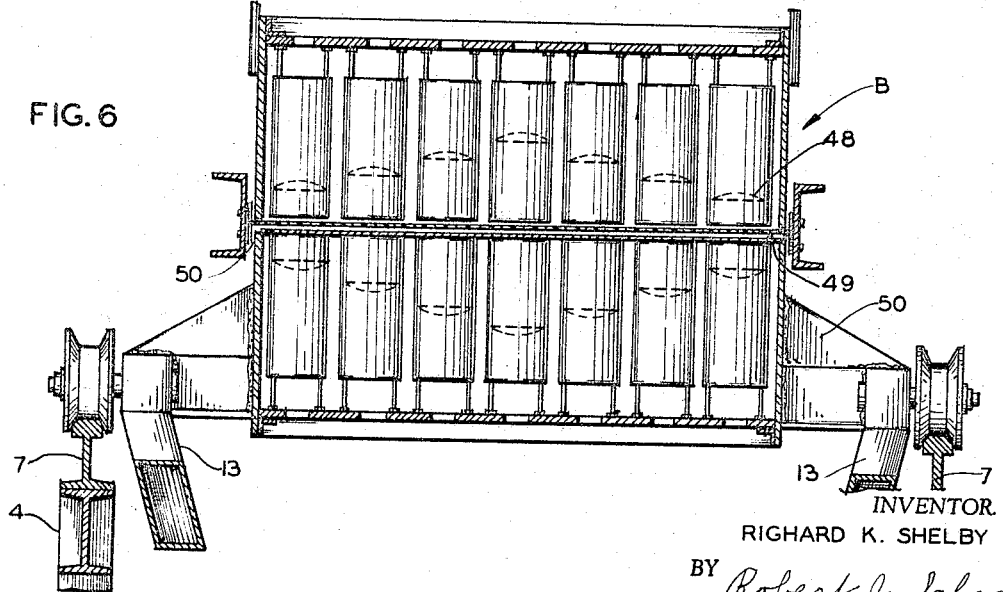

In the accompanying drawings (5 sheets):
FIGURE 1 is a side elevational view partially broken away of a molding machine constructed in accordance with and embodying the present invention;
FIGURE 2 is a vertical sectional view of the molding machine of FIGURE 1 taken along the longitudinal centerline thereof.
FIGURES 3 and 4 are horizontal fragmentary sectional views taken along lines 3—3 and 4—4 respectively of FIGURE 1.
FIGURE 5 is a vertical sectional view taken along lines 5—5 of FIGURE 1; and
FIGURE 6 is a vertical sectional view showing a modified form of molding machine constructed in accordance with and embodying the present invention.

Generally speaking the present invention comprises a modified form of the molding machine presently described in United States Letters Patent 2,967,328 to R. K. Shelby et al., with substantial improvements in the preheating means disclosed in said patent. The molding machine of the present invention generally comprises an outer supporting structure. Operatively mounted on the supporting structure and being adapted for reciprocative movement in a substantially horizontal path is a molding carriage. The molding machine is also provided with a conveyor system for advancing a web of thermoplastic material along a substantially horizontal path concurrently with the movement of the molding carriage through the machine. The molding machine is further provided with a timing mechanism for intermittently shifting the molding carriage in the direction of the advancing web of thermoplastic material for a selected distance and at the same relative movement of the web. After the carriage has been shifted to its forwardmost advanced position in the direction of the web, it automatically returns to its original position.

Operatively mounted on the longitudinally shifting molding carriage are a pair of upper and lower die frames which are disposed on opposite sides of the advancing web of thermoplastic material. The die frames are suitably provided with male and female die elements which are adapted to engage portions of the thermoplastic web and form the material contained in these portions of the web into molded articles. The upper and lower die frames are shifted into and out of engagement in timed relation to the movement of the web and to the longitudinally shifting movement of the carriage frame. In this manner, the molding operation is continuous and not intermittently interrupted during the actual forming of the thermoplastic material.

Secured to the rearward end of the molding carriage and being longitudinally shiftable therewith are upper and lower heater support frames which are disposed upon opposite sides of the moving web of thermoplastic material. The heater support frames are provided with means for accommodating a plurality of equally distributed heaters. The heaters in the upper heater frame are substantially coincident with and lie in marginal registration with the heaters in the lower heater frame and moreover, the number of heaters in the frames matches the number of male and female die elements. The cooperating male and female die elements are located in the same relative positions as the heaters mounted in the heater frames and consequently, the areas which have been preheated by the heaters are the same areas of the web which are subsequently molded in the female dies.

Referring now in more detail and by reference characters to the drawings which illustrate practical embodiments of the present invention, A designates a molding machine which is similar to the molding machine described in the Shelby et al. Patent No. 2,967,328 and which is adapted to mold a plurality of relatively thin-walled containers or cups 1 from a continuously moving web of thermoplastic material 2, the latter being preferably formed of polystyrene or modified polystyrene. The cups which are formed within the molding machine A are molded in successive groups consisting of six rows of seven cups across, with all of the cups in each group being simultaneously formed within the molding machine A. The cups are subsequently stripped from the web and the rims are curved in operations more fully described in the Shelby et al. patent. The web of thermoplastic material is formed in a suitable extruding apparatus (not shown), which is also more fully described in the aforementioned Shelby et al. patent. A web gripping and supporting conveyor structure w is operatively mounted on the molding machine A and is driven through a suitable drive mechanism (not shown), and is adapted to continuously feed the moving web through the molding machine A.

The molding machine A generally comprises a supporting frame 3 which includes lower and intermediate frame structures 4, 5. The two frame structures 4, 5 are substantially rectangular in horizontal cross section and are connected by uprights 6. The frame structure 5 includes a pair of longitudinally disposed side supporting rails 7. The remainder of the main supporting frame 3 is more fully illustrated and described in the aforementioned Shelby et al. patent and is, therefore, neither illustrated nor described in detail herein.

Welded or otherwise rigidly secured to the main supporting frame 3 is a pair of transversely spaced longitudinally extending carriage supporting rails 8 which support a traveling molding carriage 9, substantially as shown in FIGURE 3. The carriage 9 is shiftable along the rails 8 for reciprocative movement in a horizontal direction and longitudinally with respect to the main supporting frame 3. The molding machine A is provided with suitable means for driving the carriage 9 in a manner where it is reciprocative in its forward and retracting movements and is automatically controlled so that it intermittently advances through a predetermined path at the same speed as the movement of the web 2.

The molding carriage 9, which is in the form of a box-like frame structure comprises an upper horizontal cross frame structure 10 which is substantially rectangular, and a lower horizontal cross frame structure 11, the latter including a rectangular base portion 12 and obliquely extending legs 13. Identical lower supporting brackets (not shown) depend at each corner of the lower frame structure 11 and carry internally flanged rollers 14 on stub shafts 15 which are rotatably mounted on the supporting brackets for supporting the carriage 9 along the rails 8.

Extending between the upper and lower cross frame structures 10, 11 respectively are a pair of forwardly spaced guide rods 16 and a pair of rearwardly spaced guide rods 17, reference being made to FIGURE 3. Upper and lower die frames 18, 19 are suitably mounted on the guide rods 16, 17 and are adapted to shift toward and away from the continuously moving web 2 in timed relation to the longitudinal shifting movement of the carriage 9. The mechanism for shifting the upper and lower carriages 18, 19 is more fully illustrated and described in my copending application Ser. No. 333,440 filed Dec. 26, 1963, now United States Patent No. 3,268,952 and is, therefore, neither illustrated nor described in detail herein. Carried by the die frame 18 and being shiftable therewith is a die-holding block 20 having a plurality of spaced cavities or so-called female die molds 21, the interior shape of which generally conforms to the exterior shape of the finally molded cup 1. A cooperating lower die-holding block 22 is mounted on and carried by the lower die frame 19. The die-holding block 22 is provided with a series of cooperating male forming dies or plug assists 23, of which the exterior shape conforms generally to the interior shape of the finally molded cup 1.

Welded or otherwise rigidly secured to the rearwardly presented face of the upper carriage frame 10 is a mounting plate 24 and adjustably secured to the rearwardly presented surface of the mounting plate 24 is a depending L-shaped bracket 25 which is provided with means for vertically shifting the same relative to the movement of the web of thermoplastic material. Rigidly secured to and carried by the horizontal flange portion of the L-shaped bracket 25 is an upper heater support frame 26 which includes a relatively flat horizontal support plate 27 having a plurality of heat dissipating apertures 28. Welded or otherwise rigidly secured to the underside of the support plate 27 are a pair of transversely extending right angle brackets 29 and welded to the horizontal flange portions of the bracket 29 is a substantially rectangular shield 30. Thus, it can be seen that the heater support frame 26 is movable with the upper carriage frame 10. The frame 26 is supported during its longitudinal shifting movement by means of an upstanding arm 31 having a reversely bent flange 32 for retaining a roller 33. It can be seen that the roller 33 is movable along a longitudinally extending support rail 34 which is secured to a suitable super structure which has neither been described nor illustrated in order to maintain clarity. It is, of course, understood that the arm 31 is provided with means for adjusting its length so that the entire heater support frame 26 is shiftable with respect to the movable web of thermoplastic material.

Welded or otherwise rigidly secured to the rearwardly presented face of the lower carriage frame 11 is a mounting plate 35 and adjustably mounted on the mounting plate 35 is a bracket 36. A lower heater support frame 37 is similarly welded to the bracket 36 and contains a relatively flat horizontally disposed support plate 38, the latter being provided with a plurality of heat dissipating apertures 39. Welded or otherwise rigidly secured to the underside of the plate 38 are transversely extending right angle brackets 40 and welded to the brackets 40 is an upwardly extending shield 41, the shield 41 lying in substantial marginal registration with the shield 30 in the manner as shown in FIGURE 2. Rigidly secured to the rearwardly located pair of obliquely extending legs 13 are a pair of L-shaped support brackets 42 and welded to the support brackets 42 is a rearwardly extending frame supporting brace 43 for supporting the lower heater support frame 37 during its shifting movement with the lower carriage frame 11.

Mounted on and carried by the heater support frame 26 in depending relation thereto are a plurality of spaced heater housings 44. Mounted within and carried by each of the heater housings 44 is a heater 45. The housings 44 and the heaters 45 are more fully described in my copending application Ser. No. 333,508, filed Dec. 26, 1963, and are therefore neither illustrated nor described in detail herein. However, it should be pointed out, that the heaters 45 are of the infrared type and designed to emit radiation in the near infrared radiation wave length range. Moreover, the housings 44 are designed to carry the heaters 45 in adjustably selected positions relative to the web 2; that is to say, that the heaters 45 can be lowered and raised within the housing to decrease or increase their distance with respect to the web 2. Each of the heaters 45 is connected to a suitable source of electrical current (not shown) through conductors (also not shown). The amount of electrical current supplied to each of the heaters 45 is controlled through separate control elements, preferably saturable reactors (not shown), for each of the heaters 45 and consequently, it is possible to vary the voltage and hence, the heat supplied by each of the heaters 45.

Mounted on and carried by the support frame 37 are a plurality of spaced upstanding housings 46, each of which is provided with a heater 47. The housings 46 and the heaters 47 are substantially identical to the housings 44 and heaters 45, respectively. Furthermore, the heaters 47 are connected to the same suitable source of electrical current through conductors (not shown), and moreover, each of the heaters 47 is provided with separate controls for regulating the amount of current supplied thereto. By reference to FIGURES 2 and 5, it can be seen that the lower heaters 47 cooperate with the heaters 45 and each heater will be maintained in vertical alignment and thereby form heater couples which are designed to heat opposite sides of the same relative area of the moving web 2. By reference to FIGURES 3 and 4 it can be seen, that the heaters 45 are spaced relative to each other by the same equivalent spacing of the respective die molds 21 and moreover, the heaters 47 are spaced relative to each other by the same respective spacing and distance between the plug assists 23. The particular heaters 45, 47 mounted within each heater housings 44, 46 respectively have been illustrated in only one of such housings 44 in FIGURE 3 and one of such housings 46 in FIGURE 4, in order to maintain clarity in the drawings. However, it should be understood, as hereinabove stated, that each of the housings 44 is provided with a heater 45 and each of the housings 46 is provided with a heater 47.

The heater support frames 26, 37 are adjustably mounted on the horizontal flange portions of the brackets 25, 36, so that they can be shifted longitudinally with respect to the brackets 25, 36 in order to provide adjustment of the relative positions of the heater support frames 26, 37 with respect to the positions of the die frames 18, 19. The heater support frames 26, 37 are located in a position so that they substantially cover an area of the movable web 2 which is next passed between the die frames 18, 19. Moreover, the heaters 45, 47 are designed to heat selected portions of this large area which are next molded by the cooperating female and male die elements 21, 23. In other words, a portion of the web 2 which is preheated by the upper and lower heaters 45, 47 is molded by cooperating die elements 21, 23, which are located in the same relative position as the heaters 45, 47. Through this construction, only those portions of the web 2 are heated which are eventually formed within the molds. The remaining portions which serve as a support web for the molded articles are not heated by the heaters 45, 47. In this manner, it has been found that sufficient heat is provided by the heaters 45, 47 so that it is not necessary to provide additional heating elements within the plug assists 23 or within the cavities 21.

It has been found in connection with the present invention that if the heaters of the type described in the aforementioned patent application Ser. No. 333,508 filed Dec. 26, 1963 are located at distances ranging from 4 to 18 inches, more successful results have been achieved. By further reference to FIGURES 2 and 5, it can be seen that the shield 30 extends beyond the lower margins of the housings 44 and the shield 41 extends above the upper margins of the housings 46, and thereby prevent dissipation of reflected energy in the respective housings 44, 46. However, the shields 30, 41 tend to cause a gathering of the heat at a point which is substantially the center of all the emitters. In effect, the heat tends to focus at a point which is central to all of the heating elements and consequently, a greater temperature is achieved at the center of the area than at the periphery of the area covered by the banks of the heaters 45, 47. In order to avoid this concentration of heat, the heaters 45 and 47 located near the centers of the banks are positioned at a distance further from the web 2 than the heaters located near the periphery of the banks 45, 47. The relative positions of each of the heaters 45 within the bank of heaters 45 and the relative positions of each of the heaters 47 within the bank of heaters 47 can be determined by suitable temperature measuring devices so that each selected portion of the area of the web would be heated to the same relative temperature when it enters the cooperating die molds 21, 23. It has been found in connection with the present invention, that the distance between the heater and the mold increases linearly in proportion to the increase in distance from the periphery of the heater support frame to the center thereof.

An electrical control apparatus (not shown) is provided and each of the heaters 45, 47 are wired thereto so that they may be energized individually by a switch control or if desired may be energized in small groups. The specific manner of individually controlling the energization of each heater or each small group of heaters is not material to the present invention, and therefore, is not illustrated or described in detail herein. However, it is essential that some means be provided for controlling the energization of the heaters either individually or in a plurality of units.

It can be seen by means of the above outlined construction that the infrared apparatus of the present invention is considerably more efficient than the methods of the prior art inasmuch as the heaters move in timed relation to the web of thermoplastic material. Through this construction, selected portions of the web are heated and these portions which are heated are compatible with the emission of radiation and, therefore, are rapidly heated. Due to this rapid heating, the speed in which the web of material is moved through the molding machine A can be materially increased and thereby materially increase the output of the machine A. In fact, it has been found that by using the heating apparatus described herein, the web of thermoplastic material is advanced through the machine A at a rate of approximately 31 feet per minute for a web having a thickness of approximately 0.027 millimeter. In fact with the efficiency of the heating means of the present invention, it is possible to advance the web at a rate of about 38 feet per minute for the same web thickness. Of course, it should be recognized that the web movement must be varied slightly with differences in composition and in web thickness.

In use, the web 2 is continuously advanced through the molding machine A by the web moving and gripping structure w. The carriage 9 is reciprocated in its forward and retracting movements by an automatic control so that it intermittently advances through a predetermined path at the same speed as the web 2. During its forward movement, the molding elements carried by the carriage 9 are operated to form a series of cups in a predetermined area of the web 2. During this increment of time that the carriage 9 shifts to the left, reference being made to FIGURE 1, the cooperating die frames 18, 19 shift toward the web 2 and the plug assists 23 shift the preheated areas of the web 2 into the cavities 21, thereby forming the cups 1. The forming operations are completed when the carriage 9 reaches the end of its path in the direction of the advancing movement of the web and the carriage is then returned to its initial starting position with the molding elements free of the web 2 and the cycle of operations is then repeated.

During the forward movement of the carriage 9 with the web 2, the banks of heaters 45, 47 preheat selected areas of the moving web as the heaters 45, 47 shift with the carriage, in the same relative position with respect to the web 2 and at the same rate of movement as the web 2. Consequently, during one complete molding cycle where the carriage 9 shifts from its rearwardmost position to its forwardmost position each of the banks of heaters 45, 47 will heat a selected portion of the web 2 which is next molded. When the die frames 18, 19 separate and the carriage 9 is shifted to its rearwardmost position for the start of a new cycle, the cooperating die elements 21, 23 will be disposed above and below the same selected portions of the web which have been heated during the immediately preceding molding operation.

It is possible to provide a modified form of molding machine B substantially as shown in FIGURE 6. The molding machine B is substantially similar to the previously described molding machine A except that the molding machine B employs a movable bank of upper heaters 48 which travel with the upper carriage frame 10. The molding machine B, however, does not employ a movable bank of lower heaters but employs a highly reflective heat reflecting plate 49 which is merely laid facewise upon the lower banks of heaters substantially as shown in FIGURE 6. The reflecting plate 49 can be retained by any suitable fasteners such as sheet metal screws (not shown). It is possible to eliminate the lower bank of heaters and secure the reflecting plate 49 to the flange portions of a pair of L-shaped brackets which can be secured to the rearwardly presented surfaces of the rearward pair of legs 13. This latter supporting structure is obvious to the skilled artisan and is, therefore, not illustrated in detail herein. In this manner, the portion of the heat which is emitted from the heaters 48 and which is not absorbed by the web of thermoplastic material is reflected up from the heat reflecting plate 49 and a portion of the heat thereby reflected is absorbed by the web when passing through. It should also be understood that through this mechanism, it is still possible to maintain selective heating. The heat reflecting plate 49 is movable in timed relation to the upper bank of heaters 48 and in this manner, the portion of the radiation which passes through the web will be reflected into the same selected area of the web so that only that selected portion which is to be ultimately molded is heated.

It should be understood that changes and modifications in the form, construction, arrangement and combination of parts presently described and pointed out can be made and substituted for those herein shown without departing from the nature and principle of my invention.

Having thus described my invention, what I desire to claim and secure by Letters Patent is:

1. The method of forming plastic articles from a web of thermoplastic material, said method comprising the passing of said web of material into a molding machine, moving said web past a plurality of spaced heaters for heating the portions of the web which are next passed between die frames for molding thereof to a preset temperature, moving the heaters with the web and at the same rate of speed for a preselected distance, passing the web between a pair of cooperating die frames having cooperating die elements, the number of cooperating die elements being substantial equal to the number of heaters, locating the die elements in a pattern which is substantially identical to the arrangement of the heaters, engaging said die frames and molding articles from the portions of the web which have been directly preheated by said heaters, disengaging said die frames, and passing the web containing the molded articles out of the machine.

2. In a molding machine having cooperating die frames and a plurality of male and female die elements operatively mounted on the die elements for molding articles from a thermoplastic web, a heating bank frame adjacent to each of said die frames, and a plurality of heaters operatively mounted on said heating bank frames, the number of which is substantially equal to the number of cooperating die elements for preheating a selected portion of the web prior to molding thereof, said heating bank frames having the same approximate horizontal cross sectional area as said die frames and being adapted to heat the approximate area of the web which is next advanced between the die frames for molding thereof, said heaters being arranged in a pattern substantially identical to the arrangement of the die elements for directly heating the areas of the web which are next to be molded by said die elements.

3. A molding machine comprising a supporting frame, means on said frame for advancing a web of thermoplastic material along a path through said machine, a pair of cooperating die frames operatively mounted on said machines on opposite sides of the web of thermoplastic material, a plurality of cooperating male and female die elements mounted on the cooperating die frames, a heating bank frame operatively associated with each of said die frames, and a plurality of heaters operatively mounted on said heating bank frames, the number of which is substantially equal to the number of cooperating die elements for preheating a selected portion of the web prior to molding thereof, said heating bank frames having the same approximate horizontal cross sectional area as said die frames and being adapted to heat the approximate area of the web which is next advanced between the die frames for molding thereof, said heaters being arranged in a pattern substantially identical to the arrangement of the die elements for directly heating the areas of the web which are next to be molded by said die elements.

4. A molding machine comprising a supporting frame, means on said frame for continuously advancing a web of thermoplastic material along a horizontal path through said machine, a molding carriage mounted on said frame for reciprocating movement in a horizontal path, means for intermittently moving the molding carriage in the direction of the advancing web of thermoplastic material for a predetermined distance at the same speed of the movement of the web and for returning the carriage to its original position, a pair of cooperating die frames operatively mounted on said carriage on opposite sides of said web and being reciprocatively movable toward said web in timed relation to the movement of said web, a plurality of cooperating male and female die elements mounted on the cooperating die frames, a heating bank frame mounted on the rearward end of each die frame with repsect to the direction of movement of the web and being moveable therewith in the horizontal path, and a plurality of heaters operatively mounted on said heating bank frames, the number of which is equal to the number of cooperating die elements for preheating a selected portion of the web prior to molding thereof, said heating bank frames having the same approximate horizontal cross sectional area as said die frames and being adapted to heat the appoximate area of the web which is next advanced between the die frames for molding thereof, said heaters being arranged in a pattern substantially identical to the arangement of the die elements for directly heating the areas of the web which are next to be molded by said die elements.

5. A molding machine comprising a supporting frame, means on said frame for advancing a web of thermoplastic material along a path through said machine, a pair of cooperating die frames operatively mounted on said machine on opposite sides of the web of thermoplastic material, a plurality of cooperating male and female die elements mounted on the cooperating die frames, a heating bank frame operatively associated with each of said die frames, and a plurality of heaters operatively mounted on said heating bank frames, the number of which is substantially equal to the number of cooperating die elements for preheating a selected portion of the web prior to molding thereof, said heating bank frames having the same approximate horizontal cross sectional area as said die frames and being adapted to heat the approximate area of the web which is next advanced between the die frames for molding thereof, each of said heaters being mounted on said heating bank frames in substantially the same pattern as the die elements and in such manner that they have the same relative position as each of said die elements, each of said heaters being spaced from each other at a distance which is substantially equal to the spacing between each of said die elements, so that said heaters heat an area of the web which is formed in one of the pair of cooperating die elements.

6. A molding machine comprising a supporting frame, means on said frame for advancing a web of thermoplastic material along a path through said machine, a pair of cooperating die frames operatively mounted on said machine on opposite sides of the web of thermoplastic material, a plurality of cooperating male and female die elements mounted on the cooperating die frames, a heating bank frame operatively associated with each of said die frames, a plurality of tubular heater housings operatively mounted on said heating bank frames for preheating a selected portion of the web prior to molding thereof, said heater housings having an open end which faces toward said web, said heating bank frames having the same approximate horizontal cross sectional areas as said die frames and being adapted to heat the approximate area of the web which is next advanced between the die frames for molding thereof, and a heater disposed in each of said housings and being spaced from the margin of the open end thereof which faces the web, each of said heaters being designed to heat an area of the web which is formed in one of the pair of cooperating die elements.

7. A molding machine comprising a supporting frame, means on said frame for advancing a web of thermoplastic material along a path through said machine, a pair of cooperating die frames operatively mounted on said machine on opposite sides of the web of thermoplastic material, a plurality of cooperating male and female die elements mounted on the cooperating die frames, a heating bank frame operatively associated with one of said die frames, a plurality of heaters operatively mounted on said heating bank frame, the number of which is substantially equal to the number of cooperating die elements for preheating a selected portion of the web prior to molding thereof, said heaters being mounted on said heating bank frame in substantially the same pattern as the die elements for directly heating the areas of the web which is next advanced between the die frames for molding thereof, each of said heaters being designed to heat an area of the web which is formed in one of the pair of cooperating die elements, and a heat reflecting plate operatively disposed on the opposite side of said web with respect to said heating bank frame.

8. A molding machine comprising a supporting frame, means on said frame for continuously advancing a web of thermoplastic material along a horizontal path through said machine, a molding carriage mounted on said frame for reciprocative movement in a horizontal path, means for intermittently moving the molding carriage in the direction of the advancing web of thermoplastic material for a predetermined distance at the same speed of the movement of the web and for returning the carriage to its original position, a pair of cooperating die frames operatively mounted on said carriage on opposite sides of said web and being reciprocatively moveable toward said web in timed relation to the movement of said web, a plurality of cooperating male and female die elements mounted on the cooperating die frames, a heating bank frame mounted on the rearward end of each die frame with respect to the direction of movement of the web and being moveable therewith in the horizontal path, a plurality of tubular heater housings operatively mounted on said heating bank frames, the number of which is equal to the number of cooperating die elements for preheating a selected portion of the web prior to molding thereof, said heater housings having an open end which faces toward said web, said heating bank frames having the same approximate horizontal cross sectional area as said die frames and being adapted to heat the approximate area of the web which is next advanced between the die frames for molding thereof, a heater disposed in each of said housings and being spaced from the margin of the open end thereof which faces the web, each of said heater housings being mounted on said heating bank frames in such manner that they have the same relative position as each of said die elements and each of said heaters being spaced from each other at a distance which is substantially equal to the spacing between each of said die elements, so that said heaters heat an area of the web which is formed in one of the pair of cooperating die elements, the heaters located near the periphery of said heating bank frames being disposed in a position nearer to said web than the heaters located near the center of said heating bank frames, and the distance between said heaters and said web increasing substantially linearly as distance of each of said heaters and the periphery of said heating bank frames increases, and means associated with each of said heater housings for adjusting the position of each of said heaters within said housings and with respect to the web.

9. The method of forming plastic articles from a web of thermoplastic material, said method comprising the passing of said web of material into a molding machine, passing said web through a plurality of pairs of oppositely disposed cooperating sets of heaters, heating to a preset temperature marginally registered areas on both of the oppositely presented surfaces of said web which are next passed between die frames for molding thereof, moving the heaters with the web and at the same rate of speed for a preselected distance, passing the web between a pair of cooperating die frames having cooperating die elements, the number of cooperating die elements being substantially equal to the number of heaters, locating the die elements in a pattern which is substantially identical to the arrangement of the heaters, engaging said die frames and molding articles from the portions of the web which have been directly preheated by said heaters, disengaging said die frames, and passing the web containing the molded articles out of the machine.

10. The method of forming plastic articles from a web of thermoplastic material, said method comprising the passing of said web of material into a molding machine, moving said web past a plurality of spaced heaters for heating the portions of the web which are next passed between die frames for molding thereof to a preset temperature, moving the heaters with the web and at the same rate of speed for a preselected distance, permitting the heat to pass through the flat surface of the web in which the heat is incident thereupon, reflecting the heat and passing the heat through the opposite flat surface of said web, passing the web between a pair of cooperating die frames having cooperating die elements, the number of cooperating die elements being substantially equal to the number of heaters, locating the die elements in a pattern which is substantially identical to the arrangement of the heaters, engaging said die frames and molding articles from the portions of the web which have been directly preheated by said heaters, disengaging said die frames, and passing the web containing the molded articles out of the machine.

11. In a molding machine having cooperating die frames and a plurality of male and female die elements operatively mounted on said die frames for molding articles from a thermoplastic web, a heating bank frame operatively associated with said die frames, a plurality of heaters operatively mounted on said heating bank frame and being arranged in a pattern substantially identical to the arrangement of the die elements for directly heating the areas of the web which are next to be molded by said die elements, the heaters located near the periphery of said heating bank frames being disposed in a position near to said web than the heaters located near the center of said heating bank frames, and the distance between said heaters and said web increasing substantially linearly as distance of each of said heaters and the periphery of said heating frames increases.

12. In a molding machine having cooperating die frames and a plurality of male and female die elements operatively mounted on the die elements for molding articles from a thermoplastic web, a heating bank frame adjacent to one of said die frames, a plurality of heaters operatively mounted on said heating bank frame, the number of which is substantially equal to the number of pairs of cooperating die elements for preheating a selected portion of the web prior to molding thereof, and a heat reflective plate disposed on the opposite side of said web with respect to said heating bank frame for reflecting the heat which passes through said web, said heating bank frame having the same approximate horizontal cross sectional area as said die frames and being adapted to heat the approximate area of the web which is next advanced between the die frames for molding thereof, said heaters being arranged in a pattern substantially identical to the arrangement of the die elements for directly heating the areas of the web which are next to be molded by said die elements.

References Cited
UNITED STATES PATENTS

| | | | |
|---|---|---|---|
| 2,229,613 | 1/1941 | Strauch | 18—19 X |
| 2,967,328 | 1/1961 | Shelby et al. | 18—19 |
| 3,025,566 | 3/1962 | Kostur | 18—19 |
| 3,193,881 | 7/1965 | Kostur | 18—19 |
| 3,196,488 | 7/1965 | Jones-Hinton et al. | 18—19 |
| 3,207,821 | 9/1965 | Jones-Hinton et al. | 18—19 X |

WILLIAM J. STEPHENSON, *Primary Examiner.*